United States Patent [19]

Gannis

[11] Patent Number: 4,661,363

[45] Date of Patent: Apr. 28, 1987

[54] PROCESS FOR PREPARING PEANUT FLAVOR CONCENTRATE

[75] Inventor: Peter M. Gannis, Stamford, Conn.

[73] Assignee: Nabisco Brands, Parsippany, N.J.

[21] Appl. No.: 797,912

[22] Filed: Nov. 14, 1985

[51] Int. Cl.$^4$ ............................................. A23L 1/221
[52] U.S. Cl. .................................. 426/429; 426/430; 426/655; 426/632; 426/650; 426/533
[58] Field of Search ............... 426/429, 430, 655, 632, 426/650, 533

[56] References Cited

U.S. PATENT DOCUMENTS

| | | | |
|---|---|---|---|
| 1,525,272 | 2/1925 | Darrah | 426/429 X |
| 3,695,897 | 10/1972 | Uchida et al. | 426/429 |
| 4,049,833 | 9/1977 | Gannis et al. | 426/632 X |
| 4,466,987 | 8/1984 | Wilkins et al. | 426/632 |
| 4,477,482 | 10/1984 | Avera | 426/632 |

OTHER PUBLICATIONS

Winter, Jr. Consumer's Dictionary of Food Additives, 1972, Crown Publishers, Inc., New York, p. 116.

*Primary Examiner*—Joseph Golian
*Attorney, Agent, or Firm*—Richard Kornutik

[57] ABSTRACT

A nut flavor concentrate is prepared by extraction of nut meat (whole peanut, peanut meal, partially defatted peanuts, etc.) with an aqueous glycerol solution followed by removal of water from the extract. The concentrate so prepared is free from certain components normally present in the nut meat which have a deleterious effect on flavor. The concentrate is employed to impart nut flavor to nuts, candies and the like.

4 Claims, 1 Drawing Figure

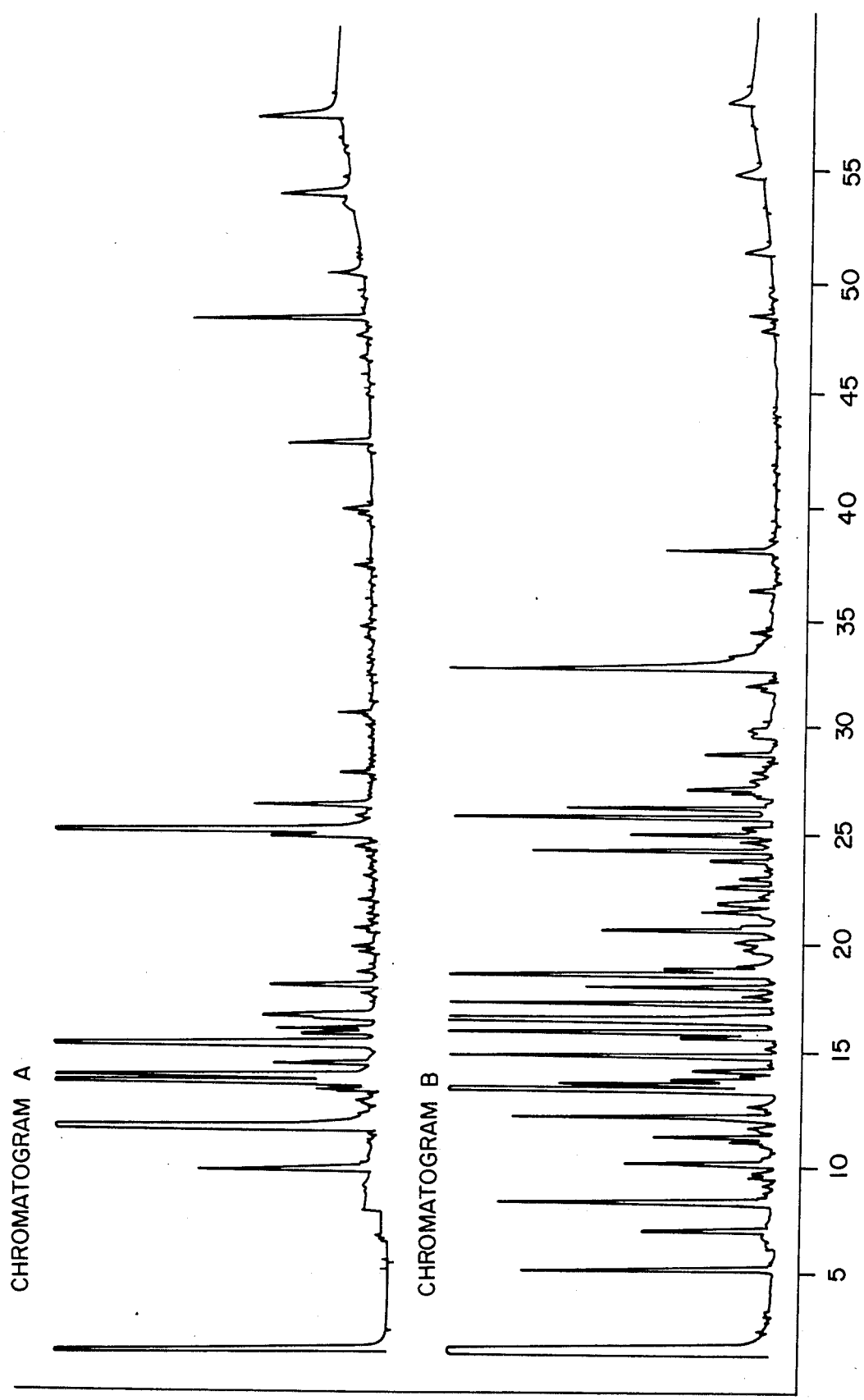

4,661,363

PROCESS FOR PREPARING PEANUT FLAVOR CONCENTRATE

BACKGROUND OF THE INVENTION

This invention relates to flavor concentrates and is more particularly concerned with improved nut flavor concentrates and with processes for their preparation.

The addition of nut flavors and aromas to a wide variety of food products enhances their acceptability. Nut flavors have been suggested for addition to foods for both human and animal consumption. Unfortunately, most of these products are synthetically derived and possess less than natural flavor profiles.

One food product which could be enhanced by a well rounded nut flavor is defatted nuts, such as produced according to U.S. Pat. Nos. 2,003,415 to Ammann and 3,294,549 to Vix et al. Later workers working in this area noted loss of flavor in defatted nuts. In U.S. Pat. No. 3,645,752 to Baxley, there is disclosed a process which is said to improve the flavor of partially-defatted nuts by quenching them in a flavored oil after roasting. In U.S. Pat. No. 3,740,236, also to Baxley, it is indicated that the roasted peanut flavor appears to be reduced in proportion to the percentage of the peanut oil removed during the pressing process. According to this patent, the defatted nuts are reconstituted in an aqueous binder solution which can also contain flavors.

Gannis et al, in U.S. Pat. No. 4,049,833, also recognized the adverse effect on the flavor and texture of partially-defatted nuts. To correct this, Gannis et al suggested contacting the partially-defatted nuts with a glycerol-containing solution during reconstitution, prior to roasting. They disclosed that after roasting, the treated nuts have improved flavor, texture and storage stability; however, the flavor did not reach the level of full-fat, roasted nuts.

The Gannis et al patent is directed to a process of reconstituting partially defatted nuts by treatment of the latter with an aqueous glycerol solution at a temperature of at least about 150° F. The nuts absorb glycerol, which is postulated to act as a fixative for the flavoring components present in the nuts and to prevent volatilization of the latter during subsequent roasting of the nuts thereby contributing to the improved flavor of the roasted nuts as compared with the flavor of partially defatted nuts roasted without previous treatment with the aqueous glycerol solution. No attempt was described to recover flavor components which might have been present in the aqueous glycerol solution remaining after the reconstitution of the partially defatted peanuts in the above process.

The extraction of raw peanuts with water to remove undesirable flavors from the nuts has been described in Ince U.S. Pat. No. 3,376,140. No recovery of flavor components from the aqueous extract was described.

Studies have been reported to the chemical composition of the volatile compounds isolated from roasted peanuts which compounds are said to be responsible for the flavor of roasted nuts; see Mason et al, J. Agr. Food Chem. 14, 454, 1966; Walrodt et al, ibid, 19, 972, 1971.

It has now been found that a flavor concentrate can be prepared, by a process which is described hereafter, which exhibits all the desirable flavor characteristics of nuts such as peanuts to an enhanced degree. This flavor concentrate can be employed to flavor defatted peanuts and other food materials.

SUMMARY OF THE INVENTION

It is an object of the invention to provide a nut flavor concentrate having enhanced flavor characteristics.

It is a further object of the invention to provide a peanut flavor concentrate which is substantially free of undesirable flavor components and which contains flavor precursors that can be added to peanuts or other products requiring nut flavor.

It is yet another object of the invention to provide a process for the preparation of a peanut flavor concentrate having enhanced flavor characteristics.

These objects, and other objects of the present invention which will be apparent from the following description, may be attained in accordance with the present invention by a process which comprises the steps of extracting nut meats such as peanut meat with an aqueous glycerol solution at an elevated temperature, separating the aqueous glycerol extract and removing the water present in the extract. In an optimal feature of the process the aqueous glycerol extract is employed in the extraction of at least one additional batch of nut meat prior to removal of the water therefrom.

The invention also comprises the flavor concentrates obtained by the above process.

The term "flavor" as used herein is inclusive of both taste and aroma, i.e., is inclusive of flavors which are detectable by the taste buds as well as by the olfactory nerve.

The term "nuts" as used herein includes whole nuts and pieces of nuts such as peanuts, almonds, Brazil nuts, filberts, pecans, walnuts and the like. For purposes of conciseness in description the following disclosure will center around the production of peanut flavor concentrates. It is not intended, however, to be limited to peanuts because the principles which apply for peanut flavor concentrates should apply to other nuts.

The term "peanut meat" is inclusive of raw whole peanuts (blanched and unblanched), as well as splits, hearts, meal and the like peanut meats which normally are utilized only for recovery of peanut oil, and is also inclusive of partially defatted peanuts.

DESCRIPTION OF THE DRAWING

FIG. 1 shows gas liquid chromatograms of (A) a typical peanut flavor concentrate prepared in accordance with the invention and (B) of peanut flavor concentrate isolated from dry roasted peanuts by purge and trap gas chromatography.

DETAILED DESCRIPTION OF THE INVENTION

The following description relates to a specific embodiment of the invention in which peanuts are used as starting material. This embodiment is offered by way of exemplification only and it is to be understood that nuts of all varieties can be employed as starting material.

In carrying out a specific embodiment of the process of the invention, peanut meat and aqueous glycerol solution are brought together in any convenient manner and heated at a temperature in the range of about 80° F. to about 200° F., preferably from about 140° F. to about 190° F., for a period which is not critical but which is advantageously of the order of about 2 minutes to about 30 minutes and preferably from about 2 minutes to about 10 minutes.

Advantageously, the aqueous glycerol solution is preheated to the desired temperature, within the ranges set forth above, and the peanut meat is added thereto and steeped therein for a predetermined period within the ranges set forth above. The proportion in which the peanut meat and the aqueous glycerol solution are employed can vary over a wide range. Illustratively, the aqueous glycerol solution is employed in an amount within the range of about 150 to about 1000 parts by weight per 100 parts by weight of peanuts. Preferably, the aqueous glycerol solution is employed in an amount within the range of about 400 parts by weight of about 600 parts by weight per 100 parts by weight of peanut meal.

The proportion of glycerol present in the aqueous glycerol solution is important in terms of extraction of precursors and flavor concentration and development. Advantageously, the proportion employed is within the range of about 10 to about 90 parts by weight per 100 parts by weight of solution and preferably is within the range of about 10 to about 20 parts by weight per 100 parts by weight of solution.

When the period of steeping of the peanut meat in the aqueous glycerol solution is complete, the steep liquor (aqueous glycerol solution) is separated from the peanut meat. The separation can be achieved in any conventional manner such as decantation, filtration, centrifugal separation and the like. The steep liquor so recovered can then be concentrated as discussed below or, in a particular embodiment, it can be employed in one or more further extractions or steeping steps using a fresh batch of peanut meat for each extraction. In between each extraction step using the same batch of steep liquor it is found that the glycerol content of the steep liquor may require adjusting by the addition of an appropriate amount of glycerol in order to maintain the glycerol content within the desired range set forth above. This is necessary because of preferential retention of some glycerol by the peanut meat during the extraction process.

The final step in the process of the invention comprises the concentration of the steep liquor to remove water therefrom. This is accomplished by heating the concentrate at or approaching the boiling point of the liquor until the water is substantially completely driven off, preferably to moisture content of less than 2%. If desired, the removal of the water can be accomplished under reduced pressure. The end point, i.e., the point at which the water has been sufficiently driven off is marked by a dramatic change in color from a milky white (the color of the original steep liquor prior to concentration) to a brown. It is believed that this change in color denotes the occurrence of a Maillard reaction between the glycerol and amino acids and or between extracted amino acids and sugars in the concentrated extract. It is to be understood that this theory is advanced for purposes of explanation only and is not critical to an understanding of the scope of the present invention.

At the same time as the above color change occurs, it is found that the reaction generates the aroma characteristic of freshly roasted peanuts. Until the aforesaid color change, the aroma of the steep liquor is very mild and not one associated with roasted peanuts.

When the above end point is reached, the resulting concentrate is cooled, or allowed to cool, to room temperature (ca 70° F.) and is stored in an appropriate manner prior to use as a flavoring agent. The concentrate so obtained can be used as a flavoring additive for incorporation in, for example, processed nuts, candies, cereals, and the like edible products.

Compounds which have been positively identified as components of the peanut flavor concentrates of the invention include pyrazine, 2-methylpyrazine, 2,5-dimethylpyrazine, 2,6-dimethylpyrazine, 2-ethyl-5-methylpyrazine, 2-ethyl-6-methylpyrazine, 2-ethyl-3-methylpyrazine, 2,3,5-trimethylpyrazine and phenylacetaldehyde; see FIG. 1, Chromatogram A. These compounds are key flavor components responsible for pleasant roasted peanut flavor. A comparable fresh roasted peanut flavor profile is also shown in FIG. 1 as Chromatogram B and includes all the key flavor components found in the peanut flavor concentrates of the invention as well as certain undesirable flavor components and non-contributory components.

The following example describes the manner and process of making and using the invention and sets forth the best mode contemplated by the inventors of carrying out the invention but is not to be construed as limiting.

EXAMPLE

This example illustrates the extraction of multiple batches of partially defatted peanuts, the steep liquor being recovered after each extraction and used to extract the subsequent batch of peanuts. Each batch of peanuts weighed 800 g. The initial batch was extracted with 4000 g of an aqueous solution containing 17% w/w of glycerol preheated to 190° F. The peanuts were added to the heated solution and held submerged therein for a period of 2.5 minutes before draining off the steep liquor, adjusting the weight of the latter to 4000 g by addition of fresh 17% w/w glycerol solution and re-using the adjusted solution to extract the next batch of peanuts. This sequence of operations was repeated until a total of 20 batches (total 16,000 g) of peanuts had been extracted. Periodically, it was found necessary to filter the steep liquor before rinsing. After the first, eighth, fifteenth and last extraction an aliquot of the steep liquor was analyzed for % soluble solids. The following results were found:

| Extraction | % soluble solids |
|---|---|
| 1 | 16.23 |
| 8 | 20.61 |
| 15 | 21.35 |
| 20 | 20.75 |

An aliquot of the steep liquor recovered from the final extraction was heated on a hot plate at a temperature of 212° F. to evaporate the water therefrom. As the last traces of water were removed, the temperature rose to about 220° F., the liquor then gradually turned brown and an aroma of freshly roasted peanuts was manifest.

What is claimed is:

1. A process for the preparation of a peanut flavor concentrate which comprises the steps of:
   (a) extracting raw, blanched or unblanched peanutmeat with an aqueous glycerol solution containing from about 10 to about 90 percent by weight of glycerol at a temperature in the range of about 80° F. to about 200° F.;
   (b) separating the aqueous glycerol extract from the peanut meat;
   (c) removing the water from the extract at or approaching the boiling point of the extract until the water is substantially driven off and the color turns brown with the development of freshly roasted peanut aroma.

2. The process of claim 1 wherein the aqueous glycerol solution employed in the extraction contains from about 10 to about 20 percent by weight of glycerol.

3. The process of claim 1 wherein the removal of water from the aqueous glycerol extract is terminated when the extract reaches a temperature of 220° F.

4. The process of claim 1 wherein the peanut meat which is subjected to extraction is partially defatted peanut meat.

* * * * *